United States Patent [19]
Dunham

[11] 4,161,056
[45] Jul. 17, 1979

[54] METHOD AND DEVICE FOR REPAIRING DAMAGED SCREW PROPELLERS

[75] Inventor: Philip N. Dunham, Biddeford, Me.

[73] Assignee: P.R.K., Inc., Orlando, Fla.

[21] Appl. No.: 822,250

[22] Filed: Aug. 5, 1977

[51] Int. Cl.² .............................................. B23P 7/00
[52] U.S. Cl. ....................................29/402; 115/34 R; 416/224; 156/94
[58] Field of Search ............. 29/401 R, 401 A, 401 B, 29/401 D, 401 E; 115/34 R; 416/224

[56] References Cited
U.S. PATENT DOCUMENTS

| | | | |
|---|---|---|---|
| 1,364,197 | 1/1921 | Heath | 416/224 |
| 2,161,533 | 6/1939 | Scholz et al. | 416/224 |
| 2,648,388 | 8/1953 | Haines et al. | 170/159 |
| 3,159,106 | 12/1964 | Schumbacker et al. | 29/401 X |
| 3,574,924 | 4/1971 | Dibble | 29/401 X |
| 4,080,708 | 3/1978 | Decombe et al. | 29/401 D |

FOREIGN PATENT DOCUMENTS

| | | | |
|---|---|---|---|
| 505497 | 5/1939 | United Kingdom | 416/224 |
| 508298 | 6/1939 | United Kingdom | 416/224 |
| 546768 | 7/1942 | United Kingdom | 416/224 |
| 548414 | 10/1942 | United Kingdom | 416/224 |

Primary Examiner—C. W. Lanham
Assistant Examiner—V. K. Rising
Attorney, Agent, or Firm—Schwartz, Jeffery, Schwab, Mack, Blumenthal & Kock

[57] ABSTRACT

Damaged screw propellers are repaired by use of hollow, thin-walled envelopes, each envelope having surfaces corresponding in configuration to an outer portion of a screw propeller blade. Each envelope is located on a blade, and a workable material is interposed between the damaged blade portion and the hollow interior of the envelope. The workable material and the envelope become an integral part of the blade to substantially duplicate the original configuration of the blade.

12 Claims, 18 Drawing Figures

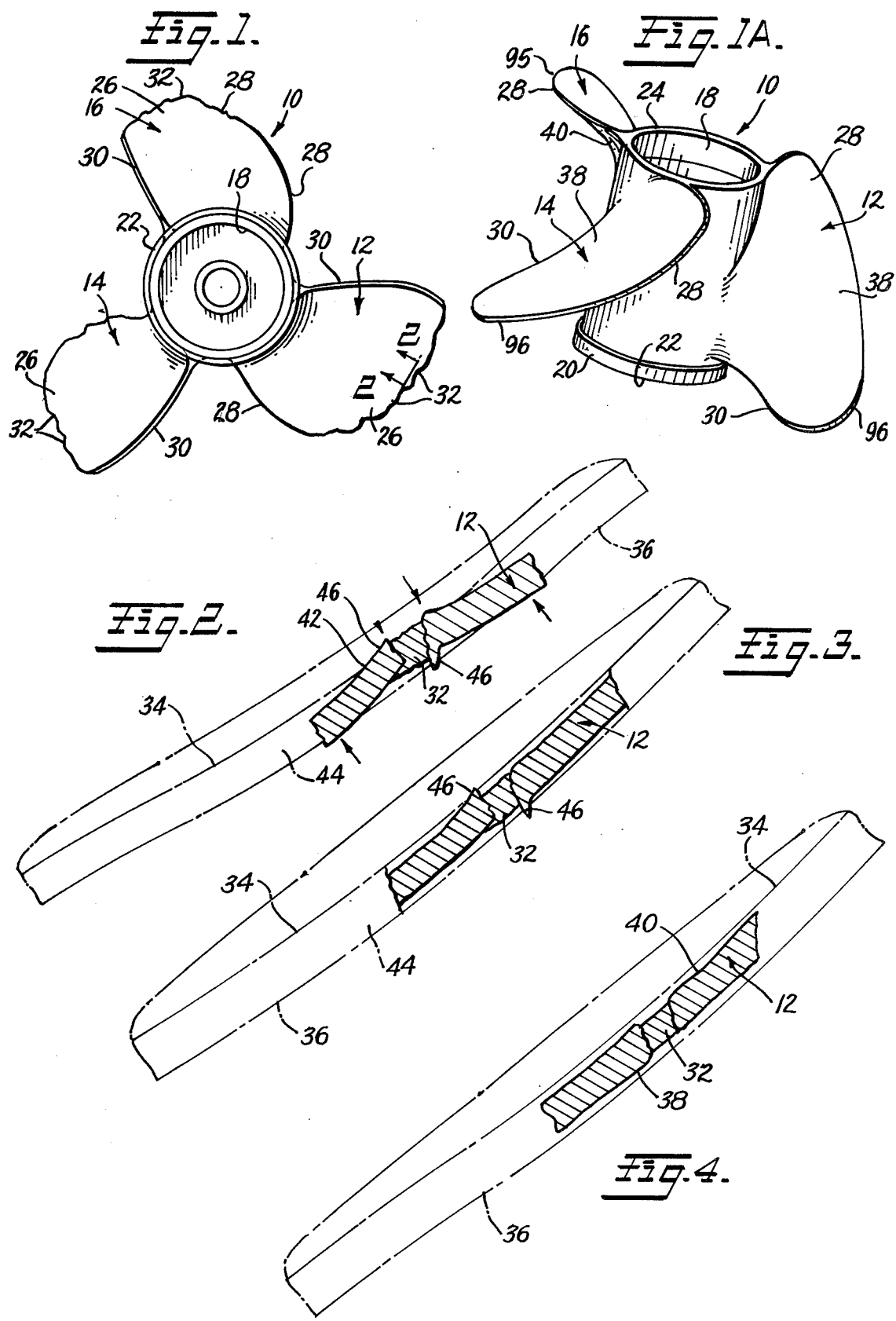

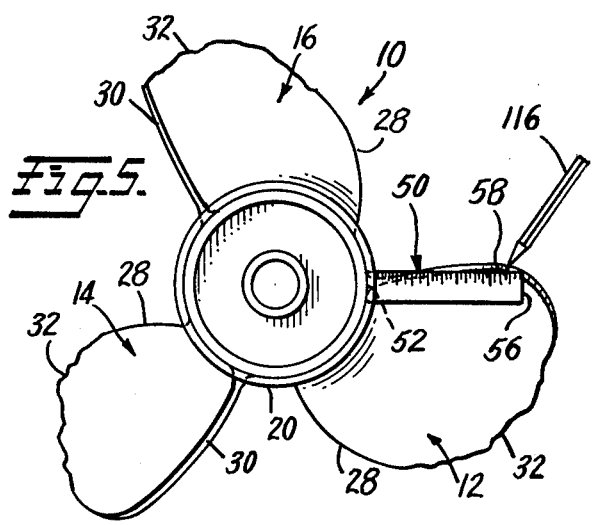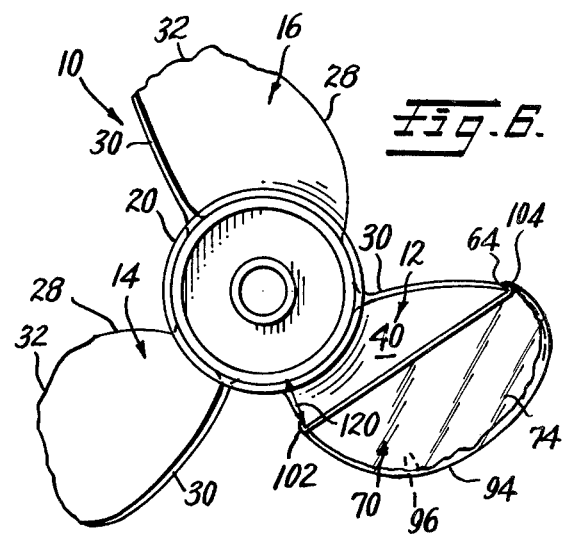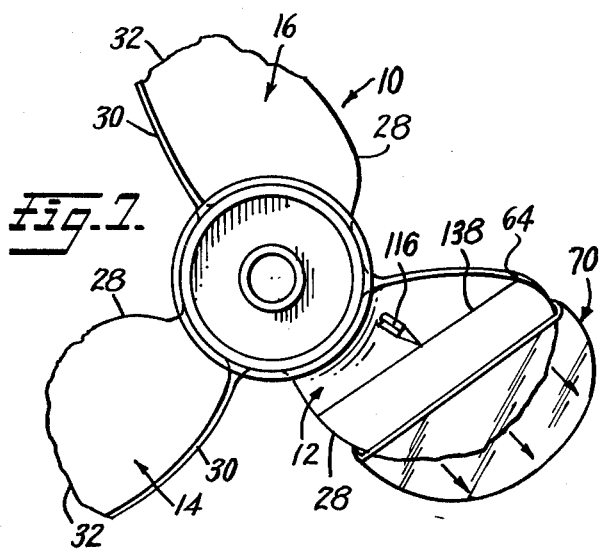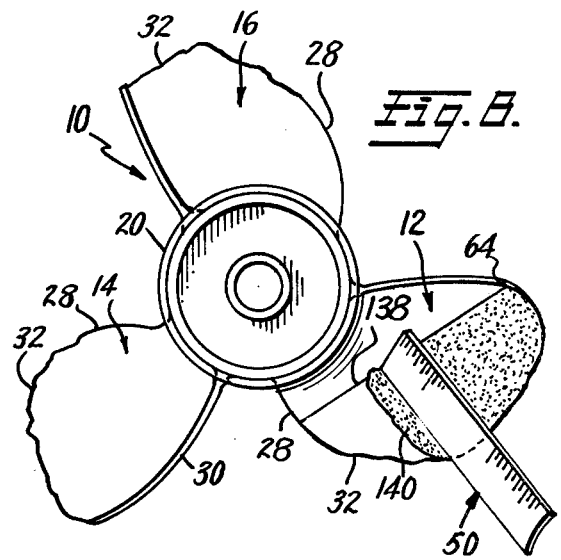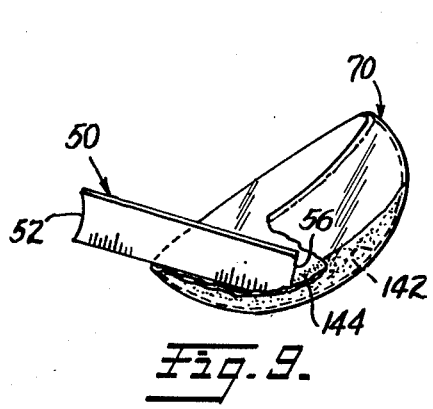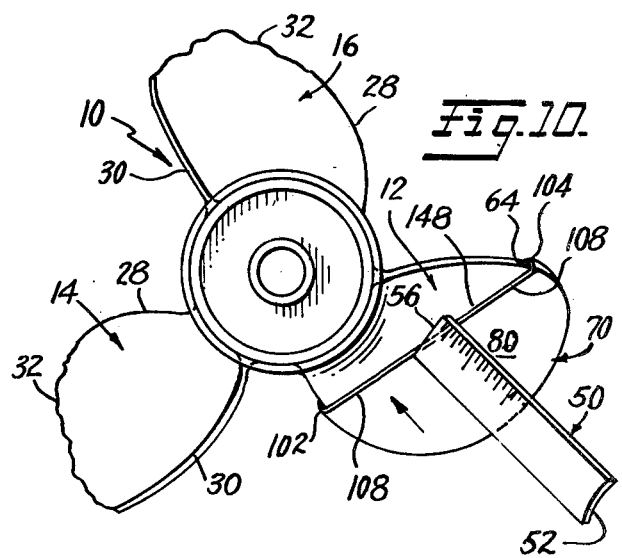

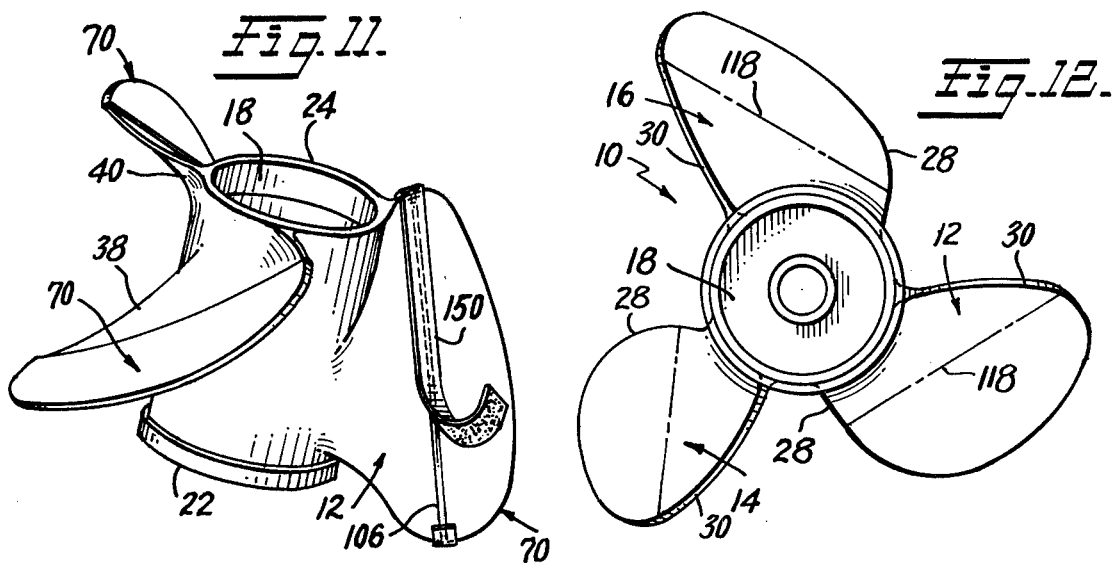
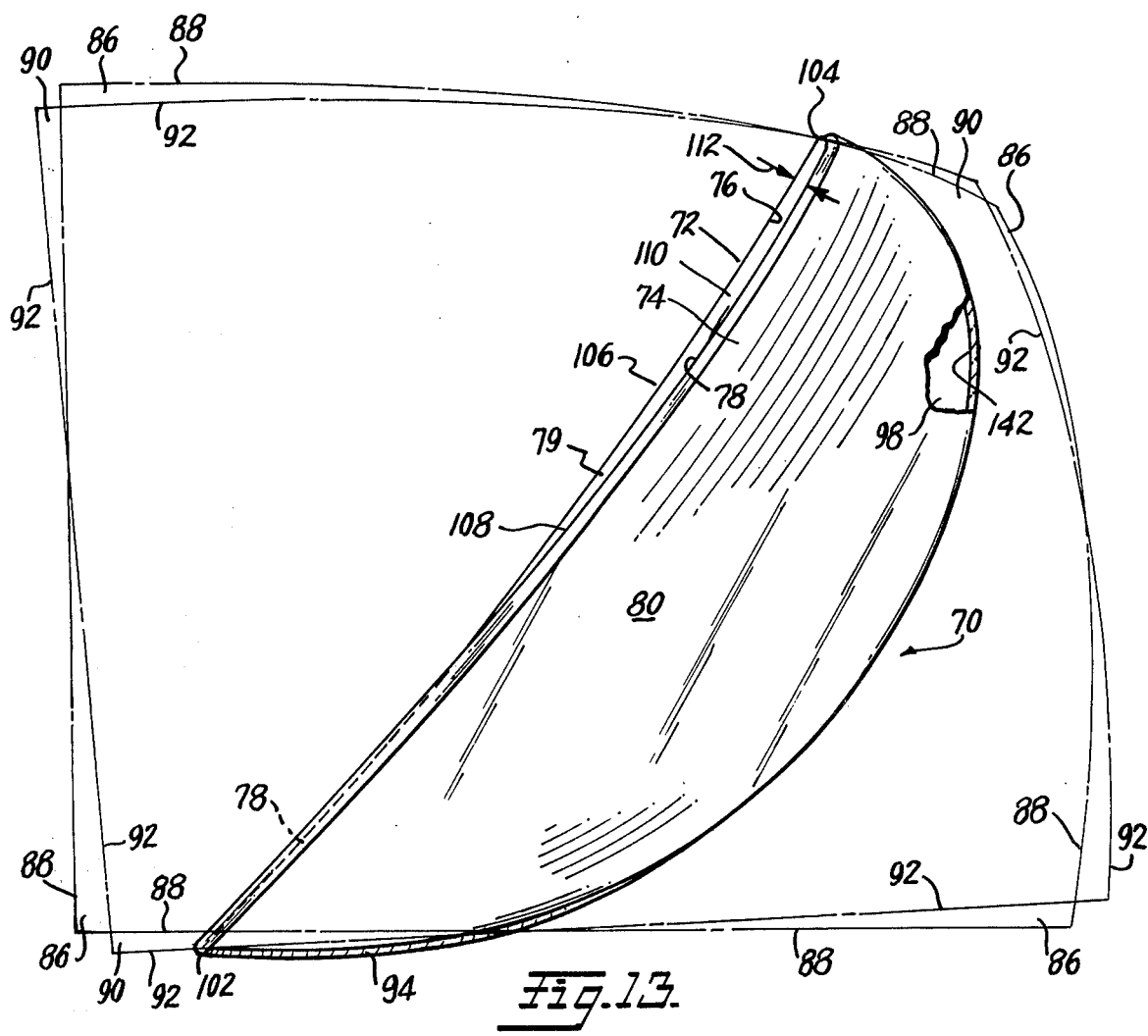

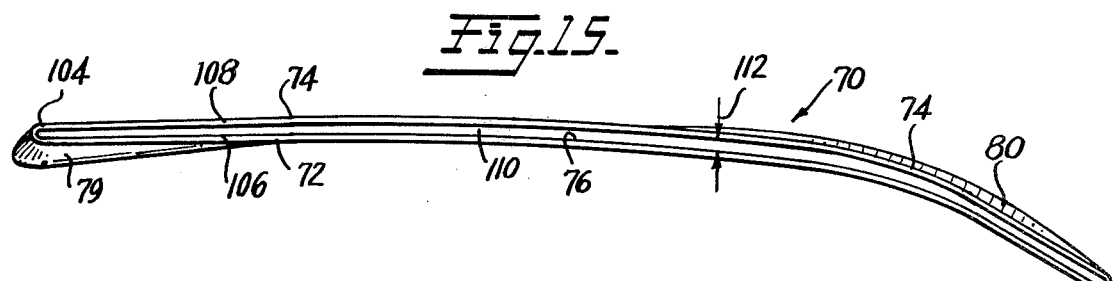
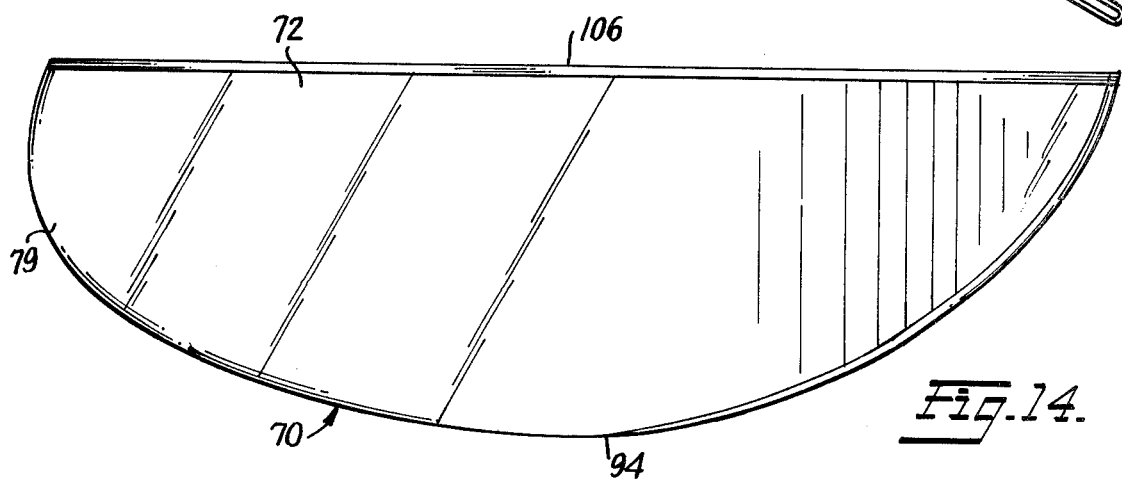
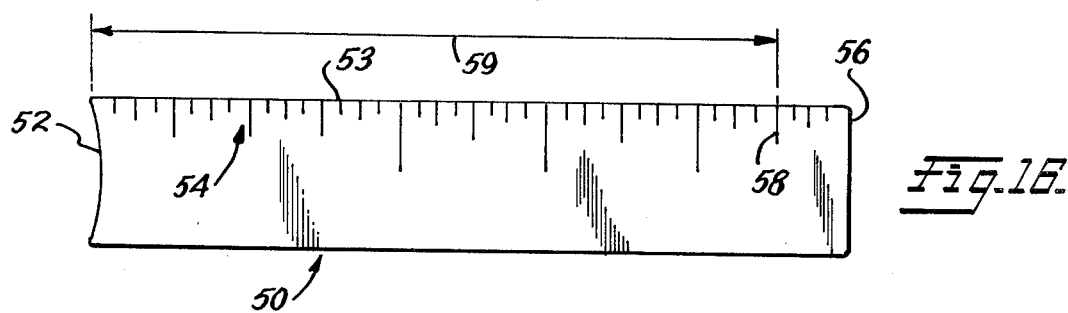
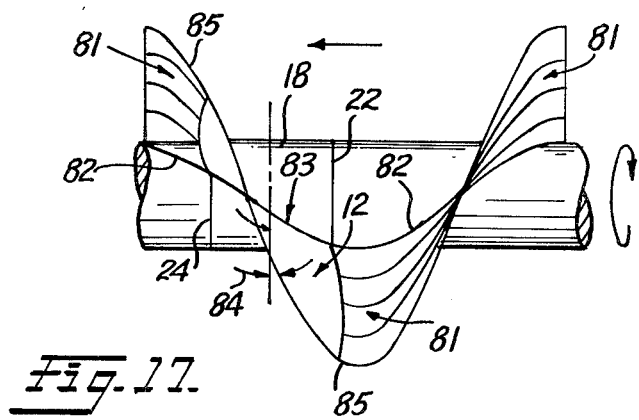

4,161,056

METHOD AND DEVICE FOR REPAIRING DAMAGED SCREW PROPELLERS

BACKGROUND AND OBJECTS

The present invention relates to repair of damaged blades of screw propellers.

It is a common occurrence for the propellers of watercraft to be damaged by coming into contact with submerged objects or surfaces, such as sand bars, beaches, rocks, or reefs, or by coming into contact with floating objects. During travel to remote locations, replacement can only be accomplished by carrying along a spare propeller. This is expensive and requires the carrying of a heavy and bulky object.

Although it is known to repair damaged propeller blades by reshaping them and adding material, such repair requires considerable expertise and specialized equipment. This is, the propeller must be sent to a special shop, which is often inconvenient and which often involves a substantial waiting period. Also, such repair is relatively expensive.

It is therefore a general object of the present invention to provide an inexpensive and simple method and device for repairing damaged screw propellers, which method and device do not require special expertise or equipment.

It is another object of the invention to provide a screw propeller repair method and device which involve the use of relatively very lightweight and compact materials.

SUMMARY

The foregoing objects are achieved by use of hollow, thin-walled envelopes which fit tightly on the outer portions of damaged screw propeller blades. Each envelope includes a pair of closely spaced main walls having inwardly facing surfaces corresponding in configuration to the helicoidal surfaces of an undamaged screw propeller. An edge wall extends between the main walls along a path corresponding to the original shape of the outer edge of the propeller blade. The walls define a hollow interior space and, in particular, the joint between the main walls and the edge wall forms an interior crease. The edge wall terminates in first and second oppositely disposed corners, and each wall has a free edge extending between the two corners. The free edges define a narrow, elongated opening in the envelope.

The hollow envelope is first positioned with respect to the damaged blade by placing a gauge against the central hub of the propeller and marking a location point on the trailing edge of the damaged blade. The envelope is placed around the outer, damaged portion, a first corner of the envelope being positioned at the marked location point. A second corner of the envelope is brought into registry with the leading edge of the blade, and a location mark is placed on the blade corresponding to the location of an edge of the envelope running from the first corner to the second corner. A coating of workable material such as epoxy is applied to the portion of the blade disposed outwardly of the mark, and the same workable material is placed into the hollow interior of the envelope to fill any spaces therein corresponding to voids in the blade due to damage. The envelope is replaced on the outer portion of the damaged blade and an edge of the envelope is aligned with the location mark. When the workable material hardens, it and the thin-walled envelope become an integral part of the blade to restore the blade to its original configuration.

BRIEF DESCRIPTION OF THE DRAWING

FIG. 1 is a rear elevational view of a damaged screw propeller;

FIG. 1A is a perspective view of the screw propeller of FIG. 1 prior to its receiving damage.

FIG. 2 is a fragmentary sectional view of a damaged blade portion taken on the line 2—2 of FIG. 1;

FIG. 3 is a fragmentary sectional view of the same damaged blade portion of FIG. 2 after working of the blade surfaces to bring them generally within the region between the helicoidal surfaces which defined the outside surfaces of the original blade;

FIG. 4 is an enlarged fragmentary sectional view of the same damaged blade portion shown in FIGS. 2 and 3 but depicting the damaged portion after further working thereof to eliminate any burrs or jagged edges extending outside the region between the helicoidal surfaces of the original blade;

FIG. 5 is a perspective view of the damaged propeller showing placement of a gauge against the propeller hub and providing a location point near the trailing edge of the damaged blade to be repaired;

FIG. 6 is a perspective view depicting placement of a hollow envelope on the outer portion of the damaged blade, locating a first corner of the envelope at the marked location point provided in FIG. 5, and bringing the opposite corner of the hollow envelope into registry with the leading edge of the blade;

FIG. 7 is a perspective view depicting making of a location mark along the edge of the sleeve between the first and second corners thereof and removal of the sleeve;

FIG. 8 is a perspective view depicting application of a coating of workable material to the portion of the blade disposed outwardly of the location mark;

FIG. 9 is a perspective view depicting placing of a workable material into the hollow interior of the envelope to fill any spaces therein corresponding to voids in the damaged blade;

FIG. 10 is a perspective view depicting replacement of the envelope on the outer portion of the damaged blade, alignment of one edge of the envelope with the location mark and pushing excess material out of the envelope;

FIG. 11 is a perspective view depicting the adding of a temporary fastening means, specifically, pressure sensitive tape, between the blade and the envelope to hold the envelope in place during setting of the workable material;

FIG. 12 depicts a repaired blade after setting of the workable material and sanding of edges;

FIG. 13 is a perspective view of the hollow envelope of the invention showing, in phantom lines, extended helicoidal surfaces which correspond with the inner surfaces of the main walls of the envelope;

FIG. 14 is a plan view of the hollow envelope of the present invention when laid on a flat surface;

FIG. 15 is a side elevation of the hollow envelope of the invention depicting the elongated opening therein;

FIG. 16 is a plan view of a gauge used in the method of the present invention;

FIG. 17 is a schematic view of an extended helicoidal propeller blade surface such as that to which surfaces of the hollow envelope of the present invention correspond.

DETAILED DESCRIPTION

In the following description and in the drawing like reference characters refer to like elements or features among the various figures of the drawing.

Referring to FIGS. 1 and 1A, reference numeral 10 generally refers to a marine screw propeller having blades 12, 14 and 16 and a central hub 18. In FIG. 1 the rear or stern side of the propeller faces the viewer. In the particular propeller shown, the rear side includes a collar 20 by which that side of the propeller may be recognized in the other figures of the drawing. For instance, in FIG. 11 the rear or stern side 22 of propeller 10 will be recognized by collar 20 while the front or bow facing side 24 thereof will be recognized by the absence of the collar 20. It will be understood that many propellers with which the method and device of the invention will be used will not include an element such as collar 20.

FIG. 1A shows propeller 10 in the undamaged condition and FIG. 1 shows the same propeller in the damaged condition, the damage shown being typical of that produced by hitting a submerged surface or a submerged or floating object. Specifically, each blade 12, 14, 16 includes a damaged area 26 thereon. Each blade 12, 14, 16 also includes a leading edge 28 and a trailing edge 30. Since it is the leading edge 28 of each blade that advances through the water as the propeller rotates, it may readily be appreciated that each leading edge and tip receives most of the damage when rotating propeller 10 comes into contact with an object or surface in the water. Damage which occurs in this manner usually involves chips, missing pieces, curled tips from running into sand bars, creating lost portions or voids 32 in the leading edge 28 of each blade 12, 14 and 16.

FIG. 2 shows an enlarged fragmentary view of a void 32 and surrounding area of a damaged propeller blade 12. While the invention will be illustrated and described primarily in connection with blade 12, it will be understood that what is shown and described applies to the other blades 14, 16 as well. Phantom lines 34, 36 in FIGS. 2-4 indicate the positions of the original surfaces of the blade 12 prior to its being damaged. Line 34 corresponds with a frontwardly facing surface 38 of blade 12 prior to damage (see FIGS. 1A and 11) and line 36 corresponds with a rearwardly facing surface 40 of blade 12 prior to damage (see FIGS. 1A and 12). It will be understood that surfaces 38, 40, prior to damage, have a helicoidal form as is standard with screw propellers. This helicoidal form is shown schematically in FIG. 17 and will be described in more detail hereinafter.

As shown in FIG. 2, it is common for certain portions 42 to be bent out of the region 44 falling between the lines 34, 36 defining the outer surfaces of blade 12 prior to damage. As a preliminary step to repairing the propeller blade 12 in accordance with the present invention, bent portions 42 should be worked back to within the general region 44 between lines 34 and 36. This may readily be accomplished by even an unskilled person without the need for special tools or instruments, since the general contour of the blade prior to damage can be easily sighted. The working of bent portions 42 back to within lines 34 36 may be carried out very simply with a hammer, or similar tool and anvil or other base. If the repair is made in the field, any available blunt instrument and base will generally suffice.

Even after portions 42 are worked generally back to within lines 34, 36, it is common for jagged edges or burrs to protrude beyond lines 34, 36 as shown in FIG. 3. These should be removed, and this may be accomplished with a grinding wheel or file. The result of such reworking is shown in FIG. 4, wherein voids 32 remain, wherein surfaces 38, 40 may be uneven, but wherein these surfaces generally fall within the region 44 of the original blade contours 34, 36. Whatever original paint remains in the damaged area 26 of blade 32 should be removed by filing or sanding.

Ordinarily, when a screw propeller strikes an object or surface during operation, all of the blades thereof will receive damage. The initial preparatory repair work described above in connection with blade 12 of propeller 10 should preferably be performed on the other damaged blades 14, 16 before any further work is started. In this regard, the preferred method of repair is to complete each stage of repair, to be described hereinafter, on all three damaged blades 12, 14 and 16 before proceeding on to the next stage.

The next stage of repair is shown in FIG. 5. This stage entails use of a gauge 50, the configuration of which is best seen by reference to FIG. 16. Gauge 50 is of elongated, flat construction and includes a gently curving end 52 for engaging the outside of the central hub 18 of the propeller to be repaired. Curving end 52 is not shaped to exactly match the circumference of the hub of any one particular propeller model. Rather it is shaped to fit reasonably securely against hubs of varying sizes. One long edge 53 of gauge 50 includes markings, generally referred to by reference character 54, indicating distances from the propeller hub. Gauge 50 includes a flat tip 56 at an end opposite the curving end 52. In accordance with instructions provided to the user, a particular marking 58 among markings 54 is selected. The selected marking 58 will vary from one propeller to another, depending on the particular manufacturer, model and size of propeller. Selected marking 58 defines a distance 59 which corresponds with the distance from the periphery of hub 18 to the radially innermost point along the trailing edge 30 of blade 12 which will tend to receive damage when the propeller 10 strikes a surface or an object in the water under operating conditions. In this regard, it has been mentioned that the primary damage is usually to the leading edge 28, and, at most, only the very outer portion of the trailing edge 30 tends to receive damage. As indicated, this factor governs the length of distance 59.

As shown in FIG. 5, curving area 52 of gauge 50 is placed into engagement with central hub 18 of the damaged propeller 10. Ruled edge 53, and in particular, selected marking 58 thereof, is aligned with the trailing edge 30 of blade 12. A point 64 on the blade corresponding with the location of selected marking 58 of gauge 50, when positioned as described, is marked on the blade by a writing instrument 66 or the like. It will be apparent that the distance between the central hub 18 and point 64 corresponds with distance 59 discussed above. That is, point 64 is the innermost point along the trailing edge 30 at which the propeller blade will tend to receive damage. As will be brought out in connection with the description of further stages of the repair process, point 64 marked on each blade 12, 14 and 16 contributes to locating a hollow, thin-walled envelope 70 on the outer portion of each blade to ensure that all of the repaired blades 12, 14 and 16 will have the same radius.

The construction and configuration of hollow envelope 70 is best seen by reference to FIGS. 13, 14 and 15. Envelope 70 includes a frontwardly facing main wall 72 and a rearwardly facing main wall 74. Main walls 72, 74 are disposed opposite to each other in close, side-by-side relationship. Specifically, main walls 72, 74 have corresponding configurations and are spaced apart at a substantially equal distance over their entire surfaces. The spacing between walls 72, 74 corresponds with the thickness of a propeller blade to be repaired. Main walls 72, 74 have inwardly facing surfaces 76, 78, respectively, each corresponding in configuration to a portion of one helicoidal surface of a screw propeller to be repaired. That is, inwardly facing surface 76 of main wall 72 corresponds in shape to a radially outer portion of frontwardly facing side 38 of each of the propeller blades 12, 14 and 16. Similarly, inwardly facing surface 78 corresponds in configuration to a radially outer portion of rearwardly facing side 40 of each of the blades 12, 14 and 16 of propeller 10. Main walls 72, 74 also have outwardly facing surfaces 79, 80, respectively, with the same general configuration.

As indicated above, it is standard for the blades of marine screw propellers to have outer surfaces in a helicoidal form. An extended helicoidal surface 81 is shown in FIG. 17 wherein the straight arrow indicates the direction of advance. It is also standard that the helix 82 laying along the radially innermost part of the helicoid 81 has a greater angle of attack 83 with respect to the plane of the hub 18 than the angle of attack 84 of the helix 85 at the outermost portion of the helicoid 81 as shown schematically in FIG. 17. For a more complete illustration and discussion of the configurations of marine screw propellers see U.S. Pat. No. 3,226,031 to R. P. Holland, Jr., the disclosure of which is hereby incorporated by reference into the present disclosure.

When a helicoidal surface such as surface 81 is extended as in FIG. 17, it is readily apparent that the surface has a twisting configuration. Walls 72, 74 of envelope 70 and the inwardly facing surfaces 76, 78 thereof also have twisting, helicoidal configurations. Since these walls and surfaces are limited to a confined area, however, the extent of twist is rather subtle. In FIG. 13, the surface 86 defined by phantom lines 88 is an imaginary extension of the helicoidal surface of inwardly facing surface 78 of envelope 70. Similarly, the helicoidal surface 90 shown by phantom lines 92 in FIG. 13 is an imaginary extension of the inwardly facing helicoidal surface 76 of envelope 70. The extent of twist has been exaggerated slightly in FIG. 13 for purposes of illustration.

Hollow envelope 70 includes an edge wall 94 extending between main walls 72, 74 along a path corresponding to the shape or profile of the outer edge of the propeller blade to be repaired prior to the blade receiving its damage. That is, edge wall 94 extends along a line corresponding to the profile of the outer edge 96 of blades 12, 14 and 16 of FIG. 1A. Together, main walls 72, 74 and edge wall 94 define an interior space 98.

Edge wall 94 terminates in a leading edge corner 102 and a trailing edge corner 104, corners 102, 104 being disposed on opposite ends of envelope 70. Main walls 72, 74 each have free edges 106, 108, respectively, extending between corners 102, 104. As shown in connection with free edge 106 in the plan view of FIG. 14, free edges 106, 108 are straight. Viewed from other perspectives, however, free edges 106, 108 will appear curved due to the curved, helicoidal configuration of walls 72, 74. Free edges 106, 108 define a narrow elongated opening 110 in the envelope. Opening 110 has a width dimension 112 corresponding to the thickness of the propeller blade to be repaired. Typically, this thickness, and thus the width dimension 112, will be on the order of ⅛ inch. It is anticipated that an envelope 70 of the present type may be used in repair of propellers with blades having thicknesses of between 1/16 inch and ⅜ inch, and thus the width 112 of opening 110 and the spacing between walls 72, 74 will preferably fall within this range.

Walls 72, 74 and 94 are all of a substantially uniform thickness throughout. These walls are provided by thin sheets of plastic material, such as vinyl, formed into the configuration shown in the drawing and described above preferably by blow molding. Preferably, too, the plastic material of envelope 70 is transparent. This facilitates inspection in the later stages of the repair process and is particularly useful in determining that all voids between the blade and envelope have been filled. Since the envelope 70 becomes an integral part of the repaired propeller, walls 72, 74 and 94 are relatively very thin. For repair of propellers of most recreational watercraft, the thickness of the walls 72, 74 and 94 will be 0.015 inches±0.005 inches. It is anticipated, however, that for a wider range of applications, the wall thickness may fall anywhere within the range of 0.005 to 0.100 inches.

Returning to the repair process and referring to FIG. 6, trailing edge corner 104 of envelope 70 is brought into registry with point 64 which has been marked on trailing edge 30 of blade 12 by use of gauge 50. The entire envelope 70 is then brought into tight-fitting, surrounding engagement with blade 12 such that: (a) main wall 72 of envelope 70 overlies frontwardly facing side 38 of blade 12 in face-to-face engagement; (b) main wall 74 of envelope 70 overlies rearwardly facing side 40 of blade 12 in face-to-face engagement, and; (c) edge wall 94 of envelope 70 engages outer blade edge 96 except, of course, where there are interruptions in edge 96 due to voids 32. The proper positioning of envelope 70 on the outer portion of blade 12 is ensured by determining that trailing edge corner 104 is in registry with point 64, as described, and, while maintaining this registry, determining that leading edge corner 102 of envelope 70 is in registry and engagement with leading edge 28 of blade 12. Envelope 70, when positioned on the outer portion of the blade in this fashion, will substantially duplicate the original outer edge profile 96 of the undamaged blade.

When the envelope 70 is in position on the blade as shown and described, edges 106, 108 define a line 118 across the surfaces 22, 24 of the blade. Preferably walls 72, 74 of envelope 70 taper in the region of edges 106, 108, so that edges 106, 108 are very thin and provide a feathered edge with respect to the blade surfaces 38, 40. Adhesive material used in subsequent stages of the repair process may collect along edges 106, 108 and tend to further obscure them. Also, if an optional, final sanding step is performed, edges 106,108 will be further obscured and blended into the repaired blade surfaces. In connection with repaired blade 12 of FIG. 12, phantom line 118 is provided to show the position of edge 106 in the completed blade. It will be readily apparent that phantom line 118 also corresponds with the position of edges 106, 108 when the envelope 70 is positioned as shown in FIG. 6. With this in mind, certain relationships between the envelope and the blade will be described by reference to FIG. 12.

Envelope 70, when positioned as shown in FIG. 6 and as described in connection therewith, will be at an incline with respect to blade 12. This is best seen by reference to phantom line 118 of FIG. 12. It is important that envelope 70 be configured to cover the major part of leading edge 28 of the blade, since the leading edge and tip receive the greatest damage. It is not necessary, however, for the envelope to cover as large a part of the trailing edge 30. Thus, envelope 70 is configured so as to assume the inclined relationship as shown. In this regard, and as is apparent from FIGS. 6 and 12, edges 106, 108 (and thus pahntom line 118) slope radially inwardly toward the leading edge 28. Specifically, envelope 70 is configured to cover approximately three-fourths of the leading edge 28 of the blade and approximately one-fourth of the trailing edge 30. The "leading edge" is considered to be the portion of the blade edge extending from the outermost extremity of the blade to the front or bow facing side 24 of central hub 18, and the "trailing edge" is considered to be the portion of the blade edge extending from the outmost extremity of the blade to the rear or stern facing side 22 of central hub 18.

As indicated above, and as apparent from the drawing, envelope 70 fits onto only the outer portion of the blade 12 to be repaired. In particular, the maximum height of envelope 70 taken along a line 136 perpendicular to one of the edges 106, 108 and extending to edge wall 94 (see FIG. 14) is less than one half the radius of the screw propeller to be repaired.

In positioning the envelope 70 on the damaged blade 12 as shown in FIG. 6, it is preferred that a measurement be taken of the distance between the leading edge corner 102 and hub 18. This is to ensure that distance 120 will be the same for each of the blades 12, 14 and 16. To whatever extent there is a variation during the initial measurement, the positioning of envelopes 70 may be adjusted to effect conformity. This ensures a uniform profile among all the blades 12, 14 and 16 and, in particular, ensures a uniform radius among all the blades 12, 14 and 16.

After envelope 70 has been positioned as shown and described in connection with FIG. 6, a location mark 138 is made across the face of the blade coinciding with one of the edges 106, 108 of the envelope. It will be readily apparent that location mark 138 coincicides with phantom line 118 of FIG. 12. Location mark 138 is preferably applied by writing instrument 116 as shown in FIG. 7. After location mark 138 has been applied, envelope 70 is then removed entirely from its surrounding engagement with the outer end of blade 12.

Next, a quantity of workable, adhesive material 140 (FIG. 8) is prepared. If, as is preferred, each stage of the repair process described herein is performed on each of the blades 12, 14 and 16 before proceeding onto the next stage, enough workable adhesive material 140 will be prepared to coat both sides 38, 40 of each blade 12, 14, and 16 and to fill all voids 32 therein. The adhesive material 140 preferably consists of a two-part epoxy comprising a resin material and hardener which are mixed just prior to being applied to the blade. Since gauge 50 is no longer needed for determining the placements of envelopes 70 on the blades, it may be used for mixing the epoxy and spreading it onto the blade 12. Preferably, the epoxy resin includes powdered aluminum dispersed throughout. In this regard, most screw propellers for recreational watercraft, particularly those used in connection with outboard motors, are fabricated of aluminum. The aluminum powder in the epoxy resin is particularly compatible with such propellers. Also, the powdered aluminum helps provide a hardened filler material somewhat approximating the original material of the propeller.

As indicated, a layer of material 140 is spread onto sides 38, 40 of blade 12. Material 140 is spread only on those portions of surfaces 38, 40 disposed radially outwardly of location mark 138, as shown in FIG. 8, to completely cover such portions.

To fill any voids 32 in the damaged blade 12, envelope 70, which was previously removed from blade 12 as shown in FIG. 7, is deformed (see FIG. 9) to expose a crease 142 (FIGS. 9 and 13) in the interior space 98 thereof. It will be apparent that crease 142 is formed by the joint between edge wall 94 and main walls 72, 74. The deformation of envelope 70 to expose crease 142 is accomplished by spreading walls 72, 74 apart at the opening 110 as shown in FIG. 9.

A workable, filler material 144 is applied to crease 142 by a flat instrument. Advantageously, the above gauge 50 may serve as the flat instrument as shown in FIG. 9. Preferably filler material 144 is the same as adhesive material 140 and is prepared at the same time. Filler material 144 is placed only in those portions of crease 142 which correspond with voids 32 of the blade when the sleeve is in surrounding engagement with the blade 12. Placement of the filler material is facilitated by the transparency of envelope 70. There will be a natural tendency of any filler material 144 in the crease 142 to fill voids 32 when sleeve 70 is replaced on blade 12. In this regard, the tight fitting engagement of sleeve 70 will create considerable pressure on filler material 144 when the sleeve is replaced on blade 12 thus causing filler material 144 to flow toward and fill all empty spaces in the interior 98 of envelope 70 created by voids 32.

FIG. 10 shows the replacement of sleeve 70 onto blade 12 subsequent to the application of adhesive 140 to the blade surfaces 38, 40 and subsequent to application of filler material 144 to crease 142 as shown in FIGS. 8 and 9. Sleeve 70 is brought into the same tight-fitting, surrounding engagement with the outer portion of blade 12 as shown in FIGS. 6 and 7 and as described in connection therewith. The one edge 106 or 108 which is in view (free edge 108 is in view in the illustration of FIG. 10) is brought into registry with location mark 138 so that edge 108 and location mark 138 are coextensive. It will be apparent that the alignment of edge 108 with location mark 138 effects repositioning of the sleeve exactly as per FIGS. 6 and 7.

A flat, blunt instrument is run along the outwardly facing surfaces 79, 80 of the repositioned envelope 70. Again, gauge 50 may be advantageously used as the instrument. This causes any excess adhesive and/or filler material 140, 144 within the envelope 70 to be squeezed out around edges 106, 108 of envelope 70 through a squeegee effect. This excess material, designated by reference character 148 in FIG. 10, is then removed from blade 12 by wiping.

To ensure that the sleeve 70 remains in tight overlying engagement with the blade 12 and particularly to ensure that free edges 106, 108 thereof remain in tight engagement with the blade, a temporary fastening means in the form of a pressure sensitive tape 150 is applied between the unrepaired surfaces of blade 12 and envelope 70 as shown in FIG. 11. The adhesive material and filler material 140, 144 is then cured by allowing it to stand at room temperature for a certain period of time or by subjecting the propeller 10 to elevated temperatures for a shorter period of time. In trials which have been conducted, the propeller has been allowed to stand at room temperature for 12 hours to effect complete curing of material 140, 144 and, alternatively, the propeller has been placed in an oven set at 150° F. for 30 minutes to effect hardening and curing. It has also been found in trials that, for emergency repairs in the field, the propeller 10 can be used before full curing of the workable material if the material has been allowed to set for at least 1 hour at ambient temperature.

It will be understood that, after setting of the workable material, envelope 70 is integral with the blade. The repaired blade 12 may then be sanded. Finally, the propeller 10 may be repainted to provide the finished, repaired blade shown in FIG. 12.

In the event that the repaired propeller 10 is again damaged in service, the above-described process may be performed again to provide a second repair. In this regard, the integral plastic envelope and epoxy filler is first removed by subjecting the propeller 10 to heat. For instance the propeller may be placed in a conventional residential oven on a foil-lined pan for one hour at 400° F. The plastic and epoxy melts and is easily wiped off. Then, the same repair process as described herein is repeated.

It will be understood that the method and device of the present invention have been illustrated and described by way of certain exemplary steps and a certain exemplary embodiment and that many modifications, substitutions, additions and deletions may be made without departing from the spirit and scope of the present invention.

I claim:

1. A method of repairing a damaged screw propeller of the type having a central hub and blades with helicoidal surfaces, the method comprising the steps of:
   (a) working any parts of a damaged screw propeller blade which fall substantially outside the helicoidal surfaces of the undamaged blade so as to bring said parts within said helicoidal surfaces;
   (b) placing a gauge against the central hub to provide a location point on the trailing edge of the damaged blade;
   (c) tightly surrounding a damaged, radially outer portion of the blade with a hollow envelope by placing at said location point a first corner of said hollow envelope and by placing a second corner of said envelope in registry with the leading edge of the blade, said envelope having surfaces corresponding in configuration to said outer portion of the blade before the blade received its damage, said envelope having edges running from said first corner to said second corner;
   (d) providing a location mark on the blade corresponding to the location of one of said edges of said envelope after said placing step;
   (e) removing said envelope from the damaged blade;
   (f) applying a coating of adhesive material to that portion of the blade disposed radially outwardly of said mark;
   (g) placing a filler material into the hollow interior of said envelope to fill any spaces in the interior of the envelope corresponding to voids in the blade due to blade damage; and
   (h) replacing said envelope on said outer portion of said damaged blade and aligning said one edge of said envelope with said location mark.

2. A method as defined in claim 1 wherein both said adhesive material and said filler material comprise an identical epoxy resin.

3. A method as defined in claim 2 including the step of effecting setting of said epoxy resin.

4. A method as defined in claim 3 wherein said step of effecting setting of said epoxy resin includes allowing said epoxy resin to set at room temperature.

5. A method as defined in claim 3 wherein said step of effecting setting of said epoxy resin includes heating of the propeller to a temperature of approximately 150° for a period of approximately 30 minutes.

6. A method as defined in claim 1 including the further step of removing excess adhesive from between the blade and sleeve after said replacing step.

7. A method as defined in claim 1 including the further steps of:
   (a) applying temporary fastening means between said blade and said envelope subsequent to said replacing step;
   (b) effecting setting of said adhesive and filler materials; and
   (c) subsequent to said step of effecting setting, removing said temporary fastening means.

8. A method as defined in claim 7 wherein said temporary fastening means is a tape having a pressure sensitive adhesive on one side.

9. A method as defined in claim 1, wherein said step of surrounding the damaged blade with a hollow envelope and said later step of replacing said envelope on said outer portion of said blade include positioning said envelope such that said edges thereof slope radially inwardly along the blade surfaces toward the leading edge of said blade.

10. A method of repairing a damaged screw propeller comprising the steps of:
    (a) locating a position for a hollow envelope with respect to a damaged blade of the propeller, the blade having lost portions due to damage, in which the hollow envelope substantially duplicates part of the surfaces of the blade prior to its receiving damage, said envelope having surfaces corresponding in configuration to surfaces of the propeller blade prior to its receiving damage;
    (b) interposing a workable material between the damaged portion of the blade and the hollow interior of the envelope to fill the lost portions and effect adhesion of the envelope to the blade; and thereafter
    (c) positioning the envelope in the position on the blade determined by said locating step and permitting the adhesion of the envelope to the blade to take effect.

11. A method of repairing a damaged screw propeller comprising the steps of:
    (a) surrounding the damaged portion of a propeller blade with a hollow envelope having external surfaces corresponding in configuration to a portion of the blade before said portion received its damage to substantially duplicate the configuration of said portion of said blade before said portion received its damage; and
    (b) securing said envelope in the position determined by said surrounding step and filling any internal voids due to blade damage between the envelope and the damaged blade with an adhesive.

12. A method as defined in claim 1, wherein said envelope becomes an integral part of said blade after said replacing step.

* * * * *